United States Patent
Miller et al.

(10) Patent No.: US 10,449,523 B2
(45) Date of Patent: *Oct. 22, 2019

(54) CRYSTALLINE BIS-AMMONIA TRANSITION METAL MOLYBDOTUNGSTATE

(71) Applicant: UOP LLC, Des Plaines, IL (US)

(72) Inventors: Stuart Miller, Arlington Heights, IL (US); Laura Collins, Seattle, WA (US); Susan C. Koster, Carpentersville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,803

(22) Filed: Dec. 9, 2016

(65) Prior Publication Data

US 2018/0169633 A1 Jun. 21, 2018

Related U.S. Application Data

(60) Provisional application No. 62/267,865, filed on Dec. 15, 2015.

(51) Int. Cl.
*B01J 27/24* (2006.01)
*B01J 21/08* (2006.01)
(Continued)

(52) U.S. Cl.
CPC .............. *B01J 27/24* (2013.01); *B01J 21/04* (2013.01); *B01J 21/08* (2013.01); *B01J 21/12* (2013.01);
(Continued)

(58) Field of Classification Search
CPC ... B01J 21/04; B01J 21/06; B01J 21/08; B01J 21/12; B01J 23/882; B01J 23/883;
(Continued)

(56) References Cited

U.S. PATENT DOCUMENTS

| 4,820,677 A | 4/1989 | Jacobson et al. |
| 4,904,634 A | 2/1990 | Wieserman et al. |

(Continued)

FOREIGN PATENT DOCUMENTS

| CA | 2719157 A1 | 10/2009 |
| CA | 2620656 C | 3/2014 |

(Continued)

OTHER PUBLICATIONS

Amaya, "Unsupported sulfides obtained from high specific area mixed oxides as hydrotreating catalysts", Revista Facultad de Ingenieria, Universidad de Antioquia (2010), 56, 58-67, Language: Spanish, Database: CAPLUS.

(Continued)

*Primary Examiner* — Jun Li

(57) ABSTRACT

A unique crystalline bis-ammonia transition metal molybdotungstate material has been developed. The material may be used as a hydroprocessing catalyst. The hydroprocessing may include hydrodenitrification, hydrodesulfurization, hydrodemetallation, hydrodearomatization, hydrodesilication, hydroisomerization, hydrotreating, hydrofining, and hydrocracking.

6 Claims, 1 Drawing Sheet

(51) Int. Cl.
  *B01J 21/04*   (2006.01)
  *B01J 21/12*   (2006.01)
  *B01J 37/00*   (2006.01)
  *B01J 37/03*   (2006.01)
  *B01J 37/04*   (2006.01)
  *B01J 37/20*   (2006.01)

(52) U.S. Cl.
  CPC ......... *B01J 37/0009* (2013.01); *B01J 37/009* (2013.01); *B01J 37/031* (2013.01); *B01J 37/04* (2013.01); *B01J 37/20* (2013.01)

(58) Field of Classification Search
  CPC ...... B01J 27/24; B01J 23/888; B01J 23/8892; B01J 37/04; B01J 37/06; B01J 37/08; B01J 37/12
  See application file for complete search history.

(56) References Cited

U.S. PATENT DOCUMENTS

| | | |
|---|---|---|
| 5,278,121 A | 1/1994 | Singhal et al. |
| 6,156,695 A | 12/2000 | Soled et al. |
| 6,162,350 A | 12/2000 | Soled et al. |
| 6,197,273 B1 | 3/2001 | Nagano et al. |
| 6,280,610 B1 | 8/2001 | Uragami et al. |
| 6,299,760 B1 | 10/2001 | Soled et al. |
| 6,534,437 B2 | 3/2003 | Eijsbouts et al. |
| 6,582,590 B1 | 6/2003 | Riley et al. |
| 6,620,313 B1 | 9/2003 | Demmin et al. |
| 6,635,599 B1 | 10/2003 | Eijsbouts et al. |
| 6,652,738 B2 | 11/2003 | Eijsbouts et al. |
| 6,712,955 B1 | 3/2004 | Hou et al. |
| 6,783,663 B1 | 8/2004 | Riley et al. |
| 6,863,803 B1 | 3/2005 | Riley et al. |
| 6,929,738 B1 | 8/2005 | Riley et al. |
| 7,229,548 B2 | 6/2007 | Riley et al. |
| 7,232,515 B1 | 6/2007 | Demmin et al. |
| 7,232,934 B2 | 6/2007 | Saleh et al. |
| 7,288,182 B1 | 10/2007 | Soled et al. |
| 7,513,989 B1 | 4/2009 | Soled et al. |
| 7,538,066 B2 | 5/2009 | Soled et al. |
| 7,544,632 B2 | 6/2009 | Soled et al. |
| 7,591,942 B2 | 9/2009 | Soled et al. |
| 7,605,107 B2 | 10/2009 | Soled et al. |
| 7,608,558 B2 | 10/2009 | Eijsbouts et al. |
| 7,648,941 B2 | 1/2010 | Soled et al. |
| 7,686,943 B2 | 3/2010 | Soled et al. |
| 7,691,257 B2 | 4/2010 | Shih et al. |
| 7,709,412 B2 | 5/2010 | Shih et al. |
| 7,749,937 B2 | 7/2010 | Domokos et al. |
| 7,776,205 B2 | 8/2010 | Soled et al. |
| 7,780,845 B2 | 8/2010 | Soled et al. |
| 7,951,746 B2 | 5/2011 | Bai et al. |
| 8,062,508 B2 | 11/2011 | Soled et al. |
| 8,067,331 B2 | 11/2011 | Eijsbouts-Spickova et al. |
| 8,080,492 B2 | 12/2011 | Kuperman et al. |
| 8,173,570 B2 | 5/2012 | Maesen et al. |
| 8,206,575 B2 | 6/2012 | Maesen et al. |
| 8,216,958 B2 | 7/2012 | Wu et al. |
| 8,318,628 B2 | 11/2012 | Brun et al. |
| 8,343,887 B2 | 1/2013 | Maesen et al. |
| 8,377,289 B2 | 2/2013 | Li et al. |
| 8,383,543 B2 | 2/2013 | Maesen et al. |
| 8,586,500 B2 | 11/2013 | Kuperman et al. |
| 8,636,967 B2 | 1/2014 | Canelon et al. |
| 8,846,560 B2 | 9/2014 | Yang et al. |
| 2008/0280754 A1* | 11/2008 | Toledo Antonio ....... B01J 23/85 502/177 |
| 2009/0114566 A1 | 5/2009 | Chen et al. |
| 2012/0065056 A1 | 3/2012 | Domokos et al. |
| 2012/0122653 A1 | 5/2012 | Maesen et al. |
| 2012/0122659 A1 | 5/2012 | Kuperman et al. |
| 2012/0172199 A1 | 7/2012 | Yang et al. |
| 2013/0068662 A1 | 3/2013 | Maesen et al. |
| 2013/0337996 A1 | 12/2013 | Eijsbouts-Spickova et al. |
| 2014/0027350 A1 | 1/2014 | Soled et al. |
| 2015/0292095 A1 | 10/2015 | Haber et al. |
| 2017/0165644 A1 | 6/2017 | Miller et al. |
| 2017/0165645 A1 | 6/2017 | Miller et al. |
| 2017/0165649 A1 | 6/2017 | Miller et al. |
| 2017/0165650 A1 | 6/2017 | Miller et al. |
| 2017/0165651 A1 | 6/2017 | Miller et al. |
| 2017/0165652 A1 | 6/2017 | Miller et al. |
| 2017/0165656 A1 | 6/2017 | Miller et al. |
| 2017/0166605 A1 | 6/2017 | Miller et al. |
| 2017/0218528 A1 | 8/2017 | Zhang et al. |

FOREIGN PATENT DOCUMENTS

| | | | |
|---|---|---|---|
| CN | 102049265 A | 5/2011 | |
| EP | 2103347 A1 | 9/2009 | |
| RU | 2098181 C1 | 12/1997 | |
| WO | 0042126 A1 | 7/2000 | |
| WO | 2009061295 A1 | 5/2009 | |
| WO | WO-2010126689 A2 * | 11/2010 | ............ B01J 23/002 |
| WO | 2014033653 A2 | 3/2014 | |

OTHER PUBLICATIONS

An, "Preparation of unsupported and mesoporous Ni—Mo—W sulfide catalysts by low temperature solid-state reaction", Journal of China University of Petroleum (Edition of Natural Science), v 31, n 6, p. 156-160, Dec. 2007, ISSN: 16735005; Publisher: Ed. Off. Journal of the Univ. Petroleum, China. Language: Chinese.

Calderon-Magdaleno, "Effect of the amount of citric acid used in the preparation of NiMo/SBA-15 catalysts on their performance in HDS of dibenzothiophene-type compounds", Catalysis Today, v 220-222, p. 78-88, Mar. 2014; ISSN: 09205861; DOI: 10.1016/j.cattod.2013.06.002; Publisher: Elsevier.

Escobar, "Effect of ethylene glycol addition on the properties of P-doped NiMo/Al2O3 HDS catalysts: Part I. Materials preparation and characterization", Applied Catalysis B: Environmental, v 88, n 3/4, p. 564-575, May 20, 2009; ISSN: 09263373; DOI: 10.1016/j.apcatb.2008.10.005; Publisher: Elsevier.

Gil-Llambias, "Hydrodesulfurization Catalysts Electrophoretic Study of Mo (or W)—Co, Mo (or W)—Ni, and Mo (or W)—Ca Sulfided Phases", J. Catal., v 102, n 1, p. 37-42, Nov. 1986; ISSN: 00219517; Publisher: Academic Press.

Levin, "Crystal Structure of an Ammonium Nickel Molybdate Prepared by Chemical Precipitation", Inorg. Chem. 1996, 35, 4191-4197.

Nava, "Effect of phosphorus addition on unsupported Ni—Mo—W sulfide catalysts prepared by the in situ activation of nickel/tetramethylammonium thiomolybdotungstate", Applied Catalysis A: General, v 303, n 2, p. 177-184, Apr. 28, 2006; ISSN: 0926860X; DOI: 10.1016/j.apcata.2005.12.025; Publisher: Elsevier.

Nikulshin, "Influence of nature of precursors of aluminum nickel molybdenum catalysts on their performance in hydrodesulfurization", Neftekhimiya, v 46, n 5, p. 371-376, 2006; Language: Russian; ISSN: 00282421; Publisher: East View Publications.

Olivas, "Trimetallic NiMoW unsupported catalysts for HDS", ACS Division of Petroleum Chemistry, Inc. Preprints, v 50, n 4, p. 372-374, Aug. 2005; ISSN: 05693799; Publisher: American Chemical Society.

Yin, "A novel porous ammonium nickel molybdate as the catalyst precursor towards deep hydrodesulfurization of gas oil", p. 873-878, 2013, ISSN: 0016-2361, Publisher: Elsevier Science.

Yin, "Mechanism of Hydrodesulfurization of dibenzothiophenes on unsupported NiMoW catalyst", Journal of Fuel Chemistry and Technology, v 41, n 8, p. 991-997, Aug. 2013; ISSN: 18725813; DOI: 10.1016/S1872-5813(13) 60043-2; Publisher: Science Press.

Zhang, "Solution synthesis of unsupported Ni—W—S hydrotreating catalysts", Catalysis Communications 8 (2007) 2232-2237.

Zhou, "Study on hydrodesulfurization process of diesel on unsupported catalyst", Petroleum Processing and Petrochemicals, v 44, n 10, p. 38-43, Oct. 2013; Language: Chinese; ISSN: 10052399; Publisher: Research Institute of Petroleum Processing, SINOPEC.

(56) References Cited

OTHER PUBLICATIONS

Clearfield, "Studies in Heavy-Metal Molybdates. I. Crystal Structure of a Basic Zinc Molybdate, NaZn2OH(H2O) (Mo04)21a", Inorganic Chemistry, vol. 15, No. 2, 1976, 335-338.

Clearfield, "Preparation and Structure of Manganese Molybdates", Inorg. Chem. 1985, 24, 4606-4609.

Clearfield, "Studies in Heavy-Metal Molybdates. 2. Crystal Structure of Disodium Di-u-hydroxo-dizin(II) Molybdate", Inorganic Chemistry, vol. 16, No. 3, 1977, 628-631.

Duan, "Ternary Ni—Co—Mo oxy-hydroxide nanoflakes grown on carbon cloth for excellent supercapacitor electrodes", Materials Letters 208 (2017) 65-68.

Hsu, "Synthesis and characterization of mesoporous Ni—Co oxy-hydroxides for pseudocapacitor application", Electrochimica Acta 94 (2013) 104-112.

Lien, "High-performance asymmetric supercapacitor consisting of Ni—Co—Cu oxy-hydroxide nanosheets and activated carbon", Electrochemistry Communications 34 (2013) 323-326.

Xiao, "Remarkable improvement of the turn-on characteristics of a Fe2O3 photoanode for photoelectrochemical water splitting with coating a FeCoW oxy-hydroxide gel", Applied Catalysis B: Environmental 212 (2017) 89-96.

\* cited by examiner

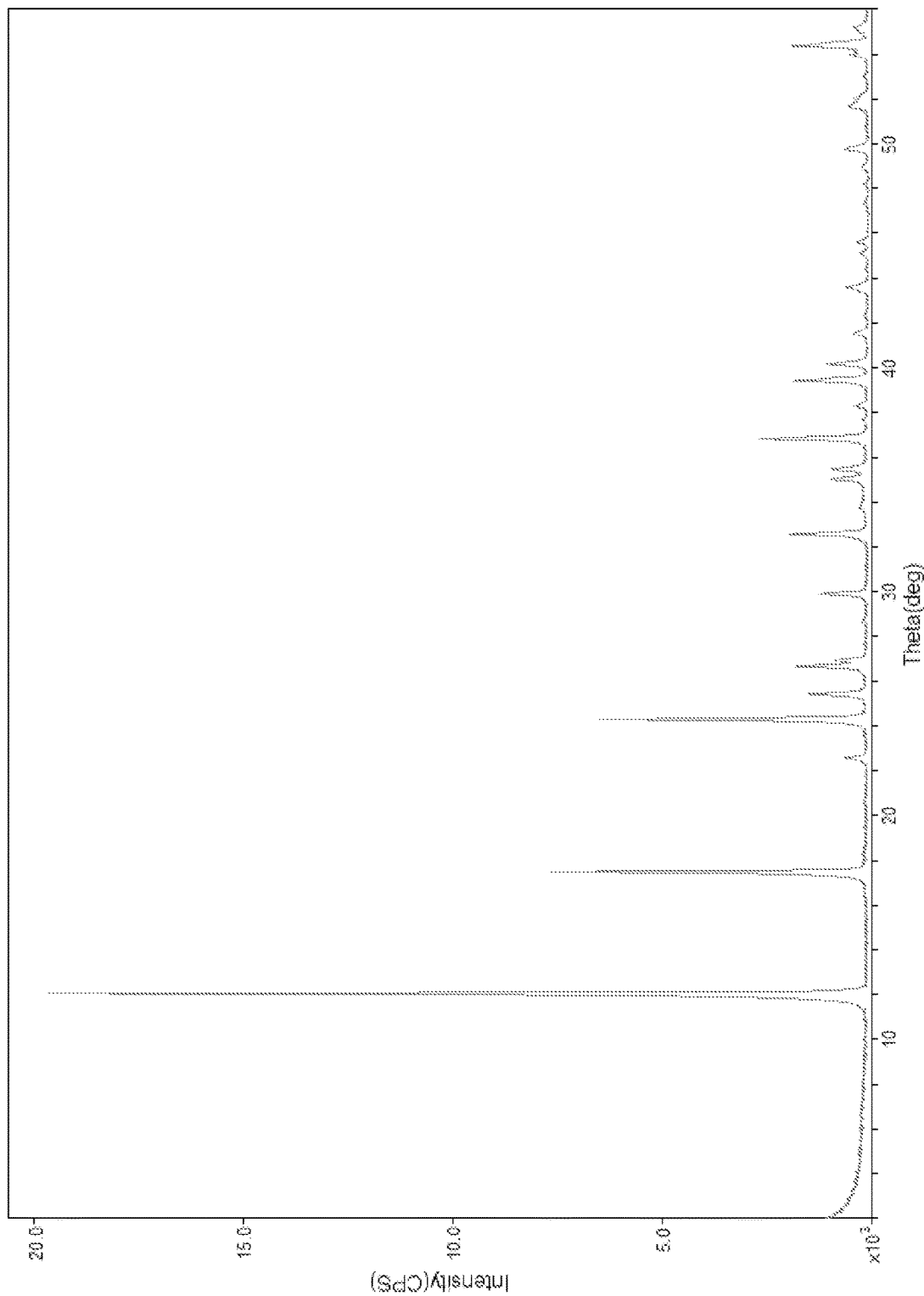

CRYSTALLINE BIS-AMMONIA TRANSITION METAL MOLYBDOTUNGSTATE

CROSS-REFERENCE TO RELATED APPLICATION

This application claims priority from Provisional Application No. 62/267,865 filed Dec. 15, 2015, the contents of which are hereby incorporated by reference.

FIELD OF THE INVENTION

This invention relates to a new hydroprocessing catalyst. More particularly this invention relates to a unique crystalline bis-ammonia transition metal molybdotungstate and its use as a hydroprocessing catalyst. The hydroprocessing may include hydrodenitrification, hydrodesulfurization, hydrodemetallation, hydrodesilication, hydrodearomatization, hydroisomerization, hydrotreating, hydrofining, and hydrocracking.

BACKGROUND

In order to meet the growing demand for petroleum products there is greater utilization of sour crudes, which when combined with tighter environmental legislation regarding the concentration of nitrogen and sulfur within fuel, leads to accentuated refining problems. The removal of sulfur (hydrodesulfurization—HDS) and nitrogen (hydrodenitrification—HDN) containing compounds from fuel feed stocks is targeted during the hydrotreating steps of refining and is achieved by the conversion of organic nitrogen and sulfur to ammonia and hydrogen sulfide respectively.

Since the late 1940s the use of catalysts containing nickel (Ni) and molybdenum (Mo) or tungsten (W) have demonstrated up to 80% sulfur removal. See for example, V. N. Ipatieff, G. S. Monroe, R. E. Schaad, Division of Petroleum Chemistry, 115$^{th}$ Meeting ACS, San Francisco, 1949. For several decades now there has been an intense interest directed towards the development of materials to catalyze the deep desulfurization, in order to reduce the sulfur concentration to the ppm level. Some recent breakthroughs have focused on the development and application of more active and stable catalysts targeting the production of feeds for ultra low sulfur fuels. Several studies have demonstrated improved HDS and HDN activities through elimination of the support such as, for example, $Al_2O_3$. Using bulk unsupported materials provides a route to increase the active phase loading in the reactor as well as providing alternative chemistry to target these catalysts.

More recent research in this area has focused on the ultra deep desulfurization properties achieved by a Ni—Mo/W unsupported 'trimetallic' material reported in, for example, U.S. Pat. No. 6,156,695. The controlled synthesis of a broadly amorphous mixed metal oxide consisting of molybdenum, tungsten and nickel, significantly outperformed conventional hydrotreating catalysts. The structural chemistry of the tri-metallic mixed metal oxide material was likened to the hydrotalcite family of materials, referring to literature articles detailing the synthesis and characterization of a layered nickel molybdate material, stating that the partial substitution of molybdenum with tungsten leads to the production of a broadly amorphous phase which, upon decomposition by sulfidation, gives rise to superior hydrotreating activities.

The chemistry of these layered hydrotalcite-like materials was first reported by H. Pezerat, contribution à l'étude des molybdates hydrates de zinc, cobalt et nickel, *C. R. Acad. Sci.*, 261, 5490, who identified a series of phases having ideal formulas $MMoO_4.H_2O$, $EHM_2O^- (MoO_4)_2.H_2O$, and $E_{2-x}(H_3O)_xM_2O(MoO_4)_2$ where E can be $NH_4^+$, $Na^+$ or $K^+$ and M can be $Zn^{2+}$, $Co^{2+}$ or $Ni^{2+}$.

Pezerat assigned the different phases he observed as being Φc, Φy or Φy and determined the crystal structures for Φx and Φy, however owing to a combination of the small crystallite size, limited crystallographic capabilities and complex nature of the material, there were doubts raised as to the quality of the structural assessment of the materials. During the mid 1970s, Clearfield et al attempted a more detailed analysis of the Φx and Φy phases, see examples A. Clearfield, M. J. Sims, R. Gopal, *Inorg. Chem.*, 15, 335; A. Clearfield, R. Gopal, C. H. Saldarriaga-Molina, *Inorg. Chem.*, 16, 628. Single crystal studies on the product from a hydrothermal approach allowed confirmation of the Φx structure, however they failed in their attempts to synthesize Φy and instead synthesized an alternative phase, Na—Cu(OH)(MoO$_4$), see A. Clearfield, A. Moini, P. R. Rudolf, *Inorg. Chem.*, 24, 4606.

The structure of Φy was not confirmed until 1996 when by Ying et al. Their investigation into a room temperature chimie douce synthesis technique in the pursuit of a layered ammonium zinc molybdate led to a metastable aluminum-substituted zincite phase, prepared by the calcination of Zn/Al layered double hydroxide $(Zn_4Al_2(OH)_{12}CO_3.zH_2O)$. See example D. Levin, S. L. Soled, J. Y. Ying, *Inorg. Chem.*, 1996, 35, 4191-4197. This material was reacted with a solution of ammonium heptamolybdate at room temperature to produce a highly crystalline compound, the structure of which could not be determined through conventional ab-initio methods. The material was indexed, yielding crystallographic parameters which were the same as that of an ammonium nickel molybdate, reported by Astier, see example M. P. Astier, G. Dji, S. Teichner, *J. Ann. Chim. (Paris)*, 1987, 12, 337, a material belonging to a family of ammonium-amine-nickel-molybdenum oxides closely related to Pezerat's materials. Astier did not publish any detailed structural data on this family of materials, leading to Ying et al reproducing the material to be analyzed by high resolution powder diffraction in order to elucidate the structure. Ying et al named this class of materials 'layered transition-metal molybdates' or LTMs.

SUMMARY OF THE INVENTION

A unique crystalline bis-ammonia transition metal molybdotungstate material has been produced and optionally sulfided, to yield an active hydroprocessing catalyst. The crystalline bis-ammonia metal molybdotungstate material has a unique x-ray powder diffraction pattern showing strong peaks at 7.33, 5.06 and 3.93 Å. The crystalline bis-ammonia transition metal molybdotungstate material has the formula:

$(NH_3)_{2-n}M(OH_2)_nMo_xW_yO_z$ where 'n' varies from 0.1 to 2.0; 'M' represents a metal selected from Mg, Mn, Fe, Co Ni, Cu, Zn and mixtures thereof; 'x' varies from 0.5 to 1.5, or between 0.6 to 1.3, or from 0.8 to 1.2; 'y' varies from 0.01 to 0.25, or between 0.1 and 0.2; the sum of (x+y) must be ≤1.501, or ≤1.2.; 'z' is a number which satisfies the sum of the valences of M, Mo and W; the material having a unique x-ray powder diffraction pattern showing peaks at the d-spacings listed in Table A:

TABLE A

| d(Å) | I/I₀ % |
|---|---|
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m |

Another embodiment involves a method of making a crystalline bis-ammonia transition metal molybdotungstate material having the formula:

$$(NH_3)_{2-n}M(OH_2)_nMo_xW_yO_z$$

where 'n' varies from 0.1 to 2.0; 'M' represents a metal selected from Mg, Mn, Fe, Co Ni, Cu, Zn and mixtures thereof; 'x' varies from 0.5 to 1.5, or between 0.6 to 1.3, or from 0.8 to 1.2; 'y' varies from 0.01 to 0.25, or between 0.1 and 0.2; the sum of (x+y) must be ≤1.501, or ≤1.2.; 'z' is a number which satisfies the sum of the valences of M, Mo and W; the material having a unique x-ray powder diffraction pattern showing peaks at the d-spacings listed in Table A:

TABLE A

| d(Å) | I/I₀ % |
|---|---|
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m | the method comprising forming a reaction mixture containing NH₄OH, H₂O, and sources of M, W, and Mo; adjusting the pH of the reaction mixture to a pH of from about 8.5 to about 10; and recovering the crystalline bis-ammonia metal molybdate material.

Yet another embodiment involves a conversion process comprising contacting a feed with a catalyst at conversion conditions to give at least one product, the catalyst comprising: a crystalline bis-ammonia transition metal molybdotungstate material having the formula:

$$(NH_3)_{2-n}M(OH_2)_nMo_xW_yO_z$$

where 'n' varies from 0.1 to 2.0; 'M' represents a metal selected from Mg, Mn, Fe, Co Ni, Cu, Zn and mixtures thereof; 'x' varies from 0.5 to 1.5, or between 0.6 to 1.3, or from 0.8 to 1.2; 'y' varies from 0.01 to 0.25, or between 0.1 and 0.2; the sum of (x+y) must be ≤1.501, or ≤1.2.; 'z' is a number which satisfies the sum of the valences of M, Mo and W; the material having a unique x-ray powder diffraction pattern showing peaks at the d-spacings listed in Table A:

TABLE A

| d(Å) | I/I₀ % |
|---|---|
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m |

Additional features and advantages of the invention will be apparent from the description of the invention, the FIG. and claims provided herein.

BRIEF DESCRIPTION OF THE DRAWING

The FIG. is the X-ray powder diffraction pattern of crystalline bis-ammonia transition metal molybdotungstates prepared by boiling crystallization according to Examples 1 to 3.

DETAILED DESCRIPTION OF THE INVENTION

The present invention relates to a crystalline bis-ammonia transition metal molybdotungstate, a process for preparing the composition, and a process where the composition is used as the catalyst. The composition has been given the designation UPM-6. This composition has an empirical formula:

$$(NH_3)_{2-n}M(OH_2)_nMo_xW_yO_z$$

where 'n' varies from 0.1 to 2.0; 'M' represents a metal selected from Mg, Mn, Fe, Co Ni, Cu, Zn and mixtures thereof; 'x' varies from 0.5 to 1.5, or between 0.6 to 1.3, or from 0.8 to 1.2; 'y' varies from 0.01 to 0.25, or between 0.1 and 0.2; the sum of (x+y) must be ≤1.501, or ≤1.2.; 'z' is a number which satisfies the sum of the valences of M, Mo and W.

The crystalline composition of the invention is characterized by having an extended network of M-O-M, where M represents a metal, or combination of metals listed above. The structural units repeat itself into at least two adjacent unit cells without termination of the bonding. The composition can have a one-dimensional network, such as. for example, linear chains.

The crystalline bis-ammonia transition metal molybdotungstate having a unique x-ray powder diffraction pattern showing peaks at the d-spacings listed in Table A.

TABLE A

| d(Å) | I/I₀ % |
|---|---|
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |

TABLE A-continued

| d(Å) | I/I$_0$ % |
|---|---|
| 3.12-3.097 | w |
| 3-2.97 | m |
| 2.76-2.73 | m |

The crystalline bis-ammonia transition metal molybdotungstate of the invention having the x-ray powder diffraction pattern shown in the FIG.

The crystalline bis-ammonia transition metal molybdotungstate is prepared by solvothermal crystallization of a reaction mixture typically prepared by mixing reactive sources of molybdenum and tungsten with the appropriate metal 'M' with a solvent as well as a source of ammonia. Specific examples of the molybdenum source which may be utilized in this invention include but are not limited to molybdenum trioxide, ammonium dimolybdate, ammonium thiomolybdate, and ammonium heptamolybdate. Specific examples of the tungsten source which may be utilized in this invention include but are not limited to tungsten trioxide, ammonium ditungstate, ammonium thiotungstate, and ammonium metatungstate. Sources of other metals "M" include but are not limited to the respective halide, acetate, nitrate, carbonate, thiols and hydroxide salts. Specific examples include nickel chloride, cobalt chloride, nickel bromide, cobalt bromide, magnesium chloride, zinc chloride, nickel nitrate, cobalt nitrate, iron nitrate, manganese nitrate, zinc nitrate, nickel acetate, cobalt acetate, iron acetate, nickel carbonate, cobalt carbonate, zinc hydroxide, nickel hydroxide and cobalt hydroxide.

The source of ammonia may include but is not limited to ammonium hydroxide, ammonium carbonate, ammonium bicarbonate, ammonium chloride, ammonium fluoride or a combination thereof.

Generally, the process used to prepare the composition of this invention involves forming a reaction mixture wherein all of the components, such as for example, Ni, Mo, W, NH$_4$OH and H$_2$O are mixed in solution together. By way of one specific example, a reaction mixture may be formed which in terms of molar ratios of the oxides is expressed by the formula:

AMO$_x$:BMoO$_y$:CWO$_z$:D(NH$_3$):H$_2$O where 'M' is selected from the group consisting of iron, cobalt, nickel, manganese, copper, zinc and mixtures thereof; 'A' represents the molar ratio of 'M' and may vary from 0.1 to 3, or from 0.75 to 2, or from 1 to 1.5; 'x' is a number which satisfies the valency of 'B' represents the molar ratio of 'Mo' and may vary from 0.1 to 3, or from 0.75 to 2, or from 1 to 1.5; 'y' is a number which satisfies the valency of 'Mo'; 'C' represents the molar ratio of 'W' and may vary from 0.01 to 2, or from 0.05 to 1, or from 0.2 to 0.75; 'z' is a number which satisfies the valency of 'W'; 'D' represents the molar ratio of NH$_3$ and may vary from 0.5 to 15 or from 1 to 10, or from 3 to 7; the molar ratio of H$_2$O, varies from 0.1 to 1000, or from 1 to 300, or from 1 to 100.

It is necessary to adjust the pH of the mixture to a value of from about 8.5 to about 10. The pH of the mixture can be controlled through the addition of a base such as NH$_4$OH, quaternary ammonium hydroxides, amines, and the like.

Once the reaction mixture is formed, the reaction mixture is reacted at temperatures ranging from about 60° C. to about 250° C. for a period of time ranging from 30 minutes to around 14 days hours. In one embodiment the temperature range for the reaction is from about 70 ° C. to about 180° C. and in another embodiment the temperature range of from about 80° C. to about 140° C. In one embodiment, the reaction time is from about 1 hour to about 48 hours, and in another embodiment the reaction time is from about 2 hours to about 12 hours. The reaction is carried out under atmospheric pressure or in a sealed vessel under autogenous pressure. In one embodiment the synthesis may be conducted in an open vessel under reflux conditions. The crystalline bis-ammonia transition metal molybdotungstate is characterized by a unique x-ray powder diffraction pattern as shown in Table A above and the FIG.

Once formed, the crystalline bis-ammonia transition metal composition may have a binder incorporated, where the selection of binder includes but is not limited to, anionic and cationic clays such as hydrotalcites, pyroaurite-sjogrenite-hydrotalcites, montmorillonite and related clays, kaolin, sepiolites, silicas, alumina such as (pseudo) boehomite, gibbsite, flash calcined gibbsite, eta-alumina, zicronica, titania, alumina coated titania, silica-alumina, silica coated alumina, alumina coated silicas and mixtures thereof, or other materials generally known as particle binders in order to maintain particle integrity. These binders may be applied with or without peptization. The binder may be added to the bulk crystalline bis-ammonia metal molybdate composition, and the amount of binder may range from about 1 to about 30 wt % of the finished catalysts or from about 5 to about 26 wt % of the finished catalyst. The binder may be chemically bound to the crystalline bis-ammonia transition metal molybdotungstate, or may be present in a physical mixture with the crystalline bis-ammonia transition metal molybdotungstate.

The crystalline bis-ammonia transition metal molybdotungstate, with or without an incorporated binder can then be optionally sulfided or pre-sulfided under a variety of sulfidation conditions, these include through contact of the crystalline bis-ammonia transition metal molybdotungstate with a sulfur containing feed as well as the use of a gaseous mixture of H$_2$S/H$_2$. The sulfidation of the crystalline bis-ammonia transition metal molybdotungstate is performed at elevated temperatures, typically ranging from 50 to 600° C., or from 150 to 500° C., or from 250 to 450° C.

The unsupported crystalline bis-ammonia transition metal molybdotungstate material of this invention can be used as a catalyst or catalyst support in various hydrocarbon conversion processes. Hydroprocessing processes is one class of hydrocarbon conversion processes in which the crystalline bis-ammonia metal molybdate material is useful as a catalyst. Examples of specific hydroprocessing processes are well known in the art and include hydrotreating or hydrofining, hydrogenation, hydrodearomatization, hydrodemetallation, hydrodesilication hydrocracking, hydrodenitrogenation, and hydrodesulfurization.

The operating conditions of the hydroprocessing processes listed above typically include reaction pressures from about 2.5 MPa to about 17.2 MPa, or in the range of about 5.5 to about 17.2 MPa, with reaction temperatures in the range of about 245° C. to about 440° C., or in the range of about 285° C. to about 425° C. Time with which the feed is in contact with the active catalyst, referred to as liquid hour space velocities (LHSV), should be in the range of about 0.1 h$^{-1}$ to about 10 h$^{-1}$, or from about 2.0 h$^{-1}$ to about 8.0 h$^{-1}$. Specific subsets of these ranges may be employed depending upon the feedstock being used. For example when hydrotreating a typical diesel feedstock, operating conditions may include from about 3.5 MPa to about 8.6 MPa, from about 315° C. to about 410° C., from about 0.25/h to about 5/h, and from about 84 Nm3 H2/m3 to about 850 Nm3

H2/m3 feed. Other feedstocks may include gasoline, naphtha, kerosene, gas oils, distillates, and reformate.

Examples are provided below so that the invention may be described more completely. These examples are only by way of illustration and should not be interpreted as a limitation of the broad scope of the invention, which is set forth in the appended claims.

Patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Powder samples were pressed flat into a plate and continuously scanned from 3° and 70° (2θ). Interplanar spacings (d) in Angstrom units were obtained from the position of the diffraction peaks expressed as θ, where θ is the Bragg angle as observed from digitized data. Intensities were determined from the integrated area of diffraction peaks after subtracting background, "Io" being the intensity of the strongest line or peak, and "I" being the intensity of each of the other peaks. As will be understood by those skilled in the art the determination of the parameter 2θ is subject to both human and mechanical error, which in combination can impose an uncertainty of about ±0.4° on each reported value of 2θ. This uncertainty is also translated to the reported values of the d-spacings, which are calculated from the 2θ values. In some of the x-ray powder diffraction patterns reported, the relative intensities of the d-spacings are indicated by the notations vs, s, m, and w, which represent very strong, strong, medium, and weak, respectively. In terms of $100(I/I_0)$, the above designations are defined as:

w=0-15, m=15-60: s=60-80 and vs=80-100.

In certain instances the purity of a synthesized product may be assessed with reference to its x-ray powder diffraction pattern. Thus, for example, if a sample is stated to be pure, it is intended only that the x-ray powder diffraction pattern of the sample is free of lines attributable to crystalline impurities, not that there are no amorphous materials present. As will be understood to those skilled in the art, it is possible for different poorly crystalline materials to yield peaks at the same position. If a material is composed of multiple poorly crystalline materials, then the peak positions observed individually for each poorly crystalline materials would be observed in the resulting summed diffraction pattern. Likewise it is possible to have some peaks appear at the same positions within different, single phase, crystalline materials, which may be simply a reflection of a similar distance within the materials and not that the materials possess the same structure.

EXAMPLE 1

In a ceramic dish, 15.21 g of nickel carbonate (0.15 moles Ni), 13.24 g ammonium heptamolybdate (0.075 moles Mo), and 18.20 g of ammonium metatungstate (0.075 moles of W) were added to 25 ml of concentrated ammonium hydroxide solution. The solution was dried at 150 C for 18 hours with periodic mixing. The dried residue was analyzed by x-ray diffraction as described above, and the X-ray powder diffraction pattern is shown in the FIG.

EXAMPLE 2

Solution A. In a 3 liter flask, 35.61 g of nickel carbonate (0.3 moles Ni) and 28.79 g molybdenum trioxide (0.2 moles Mo) were added to 300 ml of water forming a slurry. Solution B. In a 500 ml flask, 13.05 g of ammonium metatungstate (0.05 moles W) was added to 90 ml of a concentrated NH$_4$OH solution. Solution B was added to solution A before being refluxed at about 100° C. During the heating the precipitates dissolved to give a clear deep blue solution prior to the formation of a lime green precipitate. After about 2 hours, a green precipitate was observed suspended in the blue about pH 9 solution. This precipitate was cooled to room temperature, filtered, washed with 90 ml of about 90° C. water and then dried at 100° C. X-ray diffraction of the dried precipitate matches the x-ray powder diffraction pattern shown in the FIG.

EXAMPLE 3

Solution A. In a 3 liter flask, 35.61 g of nickel carbonate (0.3 moles Ni) and 28.79 g molybdenum trioxide (0.2 moles Mo) were added to 300 ml of water forming a slurry. Solution B. In a 500 ml flask, 26.1 g of ammonium metatungstate (0.1 moles W) was added to 90 ml of a concentrated NH$_4$OH solution. Solution B was added to solution A before being refluxed at about 100° C. During the heating the precipitates dissolved to give a clear deep blue solution prior to the formation of a lime green precipitate. After about 3 hours, a green precipitate was observed suspended in the blue about pH 9 solution. This precipitate was cooled to room temperature, filtered, washed with 90 ml of about 90° C. water and then dried at 100° C. X-ray powder diffraction pattern of the dried precipitate matches the X-ray powder diffraction pattern shown in the FIG.

Embodiments of the Invention

Embodiment 1 is crystalline bis-ammonia transition metal molybdotungstate material having the formula:

$(NH_3)_{2-n}M(OH_2)_nMo_xW_yO_z$ where 'n' varies from 0.1 to 2.0; 'M' represents a metal selected from Mg, Mn, Fe, Co Ni, Cu, Zn and mixtures thereof; 'x' varies from 0.5 to 1.5, or between 0.6 to 1.3, or from 0.8 to 1.2; 'y' varies from 0.01 to 0.25, or between 0.1 and 0.2; the sum of (x+y) must be ≤1.501, or ≤1.2.; 'z' is a number which satisfies the sum of the valences of M, Mo and W; the material having a unique x-ray powder diffraction pattern showing peaks at the d-spacings listed in Table A:

TABLE A

| d(Å) | I/I$_0$ % |
|---|---|
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m |

The crystalline bis-ammonia transition metal molybdotungstate material of embodiment 1 may be present in a mixture with at least one binder and wherein the mixture comprises up to 25 wt % binder.

The crystalline bis-ammonia transition metal molybdotungstate material of embodiment 1 may be present in a mixture with at least one binder and wherein the mixture comprises up to 25 wt % binder wherein the binder is selected from the group consisting of silicas, aluminas, and silica-aluminas.

The crystalline bis-ammonia transition metal molybdotungstate material of embodiment 1 where M is nickel or cobalt.

The crystalline bis-ammonia transition metal molybdotungstate material of embodiment 1 where M is nickel.

The crystalline bis-ammonia transition metal molybdotungstate material of embodiment 1 wherein the material is sulfided.

Embodiment 2 is a method of making a crystalline bis-ammonia transition metal molybdotungstate material having the formula:

$$(NH_3)_{2-n}M(OH_2)_nMo_xW_yO_z$$

where 'n' varies from 0.1 to 2.0; 'M' represents a metal selected from Mg, Mn, Fe, Co Ni, Cu, Zn and mixtures thereof; 'x' varies from 0.5 to 1.5, or between 0.6 to 1.3, or from 0.8 to 1.2; 'y' varies from 0.01 to 0.25, or between 0.1 and 0.2; the sum of (x+y) must be ≤1.501, or ≤1.2.; 'z' is a number which satisfies the sum of the valences of M, Mo and W; the material having a unique x-ray powder diffraction pattern showing peaks at the d-spacings listed in Table A:

TABLE A

| d(Å) | I/I$_0$ % |
|---|---|
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m | the method comprising: forming a reaction mixture containing sources of M, W, and Mo; adjusting the pH of the reaction mixture to a pH of from about 8.5 to about 10; heating the solution to between 85-100° C. until the resultant pH is between 8.5 and 9.5 and then recovering the crystalline bis-ammonia transition metal molybdotungstate material.

The process of embodiment 2 where the recovering may be by filtration or centrifugation.

The process of embodiment 2 further comprising adding binder to the recovered bis-ammonia transition metal molybdotungstate material.

The process of embodiment 2 further comprising adding binder to the recovered bis-ammonia transition metal molybdotungstate material where the binder may be selected from the group consisting of aluminas, silicas, and alumina-silicas.

The process of embodiment 2 further comprising sulfiding the recovered bis-ammonia transition metal molybdotungstate material.

Embodiment 3 is a conversion process comprising contacting a feed with a catalyst at conversion conditions to give at least one product, the catalyst comprising: a crystalline bis-ammonia transition metal molybdotungstate material having the formula:

$$(NH_3)_{2-n}M(OH_2)_nMo_xW_yO_z$$

where 'n' varies from 0.1 to 2.0; 'M' represents a metal selected from Mg, Mn, Fe, Co Ni, Cu, Zn and mixtures thereof; 'x' varies from 0.5 to 1.5, or between 0.6 to 1.3, or from 0.8 to 1.2; 'y' varies from 0.01 to 0.25, or between 0.1 and 0.2; the sum of (x+y) must be ≤1.501, or ≤1.2.; 'z' is a number which satisfies the sum of the valences of M, Mo and W; the material having a unique x-ray powder diffraction pattern showing peaks at the d-spacings listed in Table A:

TABLE A

| d(Å) | I/I$_0$ % |
|---|---|
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m |

The process of embodiment 3 where the conversion process is hydroprocessing.

The process of embodiment 3 where the conversion process is selected from the group consisting of hydrodenitrification, hydrodesulfurization, hydrodemetallation, hydrodearomatization, hydroisomerization, hydrodesilication, hydrotreating, hydrofining, and hydrocracking The process of embodiment 3 wherein the crystalline bis-ammonia transition metal molybdotungstate material is present in a mixture with at least one binder and wherein the mixture comprises up to 25 wt % binder.

The process of embodiment 3 wherein the crystalline bis-ammonia transition metal molybdotungstate material is sulfided.

The invention claimed is:

1. A crystalline bis-ammonia transition metal molybdotungstate material having the formula:

$$(NH_3)_{2-n}M(OH_2)_nMo_xW_yO_z$$

where 'n' varies from 0.1 to 2.0; 'M' represents a metal selected from Mg, Mn, Fe, Co Ni, Cu, Zn and mixtures thereof; 'x' varies from 0.5 to 1.5; 'y' varies from 0.01 to 0.25; the sum of (x+y) must be ≤1.501; 'z' is a number which satisfies the sum of the valences of M, Mo and W; the material having a unique x-ray powder diffraction pattern showing peaks at the d-spacings listed in Table A:

TABLE A

| d(Å) | I/I$_0$ % |
|---|---|
| 7.49-7.28 | vs |
| 5.1-5.05 | s |
| 4.4-4.257 | w |
| 3.966-3.915 | m |
| 3.69-3.645 | s |
| 3.52-3.48 | m |
| 3.35-3.32 | m |
| 3.31-3.29 | m |
| 3.12-3.097 | w |
| 3-2.97 | m |
| 2.76-2.73 | m. |

2. The crystalline bis-ammonia transition metal molybdotungstate material of claim 1 wherein the crystalline bis-ammonia metal molybdotungstate material is present in a mixture with at least one binder and wherein the mixture comprises up to 25 wt % binder.

3. The crystalline bis-ammonia transition metal molybdotungstate material of claim 2 wherein the binder is selected from the group consisting of silicas, aluminas, and silica-aluminas.

4. The crystalline bis-ammonia transition metal molybdotungstate material of claim 1 wherein M is nickel or cobalt.

5. The crystalline bis-ammonia transition metal molybdotungstate material of claim 1 wherein M is nickel.

6. The crystalline bis-ammonia transition metal molybdotungstate material of claim 1 wherein the crystalline bis-ammonia metal molybdate material is sulfided.

* * * * *